(12) United States Patent
Chen et al.

(10) Patent No.: US 11,065,902 B2
(45) Date of Patent: Jul. 20, 2021

(54) RECORDING MEDIUM

(71) Applicant: Hewlett-Packard Development Company, L.P., Spring, TX (US)

(72) Inventors: Tao Chen, San Diego, CA (US); Xulong Fu, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 88 days.

(21) Appl. No.: 16/309,571

(22) PCT Filed: Oct. 11, 2016

(86) PCT No.: PCT/US2016/056460
§ 371 (c)(1),
(2) Date: Dec. 13, 2018

(87) PCT Pub. No.: WO2018/071006
PCT Pub. Date: Apr. 19, 2018

(65) Prior Publication Data
US 2019/0184727 A1    Jun. 20, 2019

(51) Int. Cl.
*B41M 5/50* (2006.01)
*B41M 5/52* (2006.01)
(Continued)

(52) U.S. Cl.
CPC ............ *B41M 5/502* (2013.01); *B32B 23/00* (2013.01); *B32B 27/20* (2013.01); *B32B 27/26* (2013.01); *B32B 27/30* (2013.01); *B32B 27/32* (2013.01); *B32B 27/36* (2013.01); *B32B 27/42* (2013.01); *B41M 5/50* (2013.01); *B41M 5/506* (2013.01); *B41M 5/508* (2013.01); *B41M 5/52* (2013.01); *B41M 5/5218* (2013.01); *B41M 5/5236* (2013.01); *B41M 5/5245* (2013.01); *B41M 5/5254* (2013.01); *C08K 3/013* (2018.01);
(Continued)

(58) Field of Classification Search
CPC ...... B41M 5/50; B41M 5/506; B41M 5/5218; B41M 5/5245; B41M 5/5254; C04B 20/10
USPC ....................................... 428/32.3
See application file for complete search history.

(56) References Cited

U.S. PATENT DOCUMENTS 5,879,442 A    3/1999  Nishiguchi et al.
6,150,289 A   11/2000  Chen et al.
(Continued)

FOREIGN PATENT DOCUMENTS

EP    1083467    6/1986
EP    1861258   12/2007
(Continued)

OTHER PUBLICATIONS

International Search Report dated Jul. 13, 2017 for PCT/US2016/056460, Applicant Hewlett-Packard Development Company, L.P.
(Continued)

*Primary Examiner* — Betelhem Shewareged
(74) *Attorney, Agent, or Firm* — Thorpe North & Western LLP

(57) ABSTRACT

According to an example, a recording medium may include a substrate; a first coating including an inorganic pigment, a first binder, and a fixative agent; and a second coating including inorganic nanoparticles and a second binder; in which the inorganic pigment may be a plate-shaped pigment.

20 Claims, 1 Drawing Sheet

(51) Int. Cl.

| | | |
|---|---|---|
| *C09D 7/61* | (2018.01) | |
| *C09D 7/40* | (2018.01) | |
| *C08K 3/013* | (2018.01) | |
| *B32B 23/00* | (2006.01) | |
| *B32B 27/20* | (2006.01) | |
| *B32B 27/26* | (2006.01) | |
| *B32B 27/30* | (2006.01) | |
| *B32B 27/32* | (2006.01) | |
| *B32B 27/36* | (2006.01) | |
| *B32B 27/42* | (2006.01) | |
| *C08K 3/10* | (2018.01) | |
| *C08K 3/34* | (2006.01) | |
| *C08L 9/00* | (2006.01) | |
| *D21H 15/02* | (2006.01) | |
| *D21H 19/36* | (2006.01) | |
| *D21H 19/38* | (2006.01) | |
| *D21H 19/40* | (2006.01) | |
| *D21H 19/44* | (2006.01) | |
| *D21H 19/52* | (2006.01) | |
| *D21H 19/54* | (2006.01) | |
| *D21H 19/56* | (2006.01) | |
| *D21H 19/58* | (2006.01) | |
| *D21H 19/60* | (2006.01) | |
| *D21H 19/64* | (2006.01) | |
| *D21H 19/82* | (2006.01) | |
| *D21H 21/52* | (2006.01) | |
| *C08K 3/26* | (2006.01) | |

(52) U.S. Cl.
CPC .............. *C08K 3/10* (2013.01); *C08K 3/34* (2013.01); *C08L 9/00* (2013.01); *C09D 7/61* (2018.01); *C09D 7/70* (2018.01); *D21H 15/02* (2013.01); *D21H 19/36* (2013.01); *D21H 19/38* (2013.01); *D21H 19/385* (2013.01); *D21H 19/40* (2013.01); *D21H 19/44* (2013.01); *D21H 19/52* (2013.01); *D21H 19/54* (2013.01); *D21H 19/56* (2013.01); *D21H 19/58* (2013.01); *D21H 19/60* (2013.01); *D21H 19/64* (2013.01); *D21H 19/822* (2013.01); *D21H 21/52* (2013.01); *C08K 2003/265* (2013.01); *C08K 2201/011* (2013.01)

(56) References Cited

U.S. PATENT DOCUMENTS

| | | | |
|---|---|---|---|
| 6,517,929 | B1* | 2/2003 | Shibatani ................. B41M 5/52 427/152 |
| 8,114,487 | B2 | 2/2012 | Schultz et al. |
| 9,370,957 | B2 | 6/2016 | Nagoshi |
| 2001/0009712 | A1* | 7/2001 | Totani ................... B41M 5/506 428/32.24 |
| 2003/0008115 | A1* | 1/2003 | Sugiyama ............. B41M 5/502 428/195.1 |
| 2003/0134093 | A1 | 7/2003 | Kitamura et al. |
| 2003/0152720 | A1* | 8/2003 | Lubar ................... B41M 5/506 428/32.25 |
| 2004/0012663 | A1 | 1/2004 | Takashima et al. |
| 2006/0102304 | A1 | 5/2006 | Nutbeem et al. |
| 2007/0202264 | A1 | 8/2007 | Ruschak et al. |
| 2009/0035489 | A1* | 2/2009 | Kaimoto ................ B41M 5/502 428/32.1 |
| 2009/0136692 | A1* | 5/2009 | Takahashi ............. B41M 5/506 428/32.25 |
| 2009/0214806 | A1 | 8/2009 | Kobayashi |
| 2011/0052818 | A1 | 3/2011 | Osterberg et al. |
| 2011/0111144 | A1 | 5/2011 | Wasai et al. |
| 2011/0212278 | A1* | 9/2011 | Watanabe ............. B41M 5/502 428/32.18 |
| 2012/0154502 | A1* | 6/2012 | Romano, Jr. ........ B41M 5/5218 347/105 |
| 2012/0194625 | A1 | 8/2012 | Niu et al. |
| 2013/0034656 | A1 | 2/2013 | Sarkisian et al. |
| 2013/0260992 | A1 | 10/2013 | Nahm |

FOREIGN PATENT DOCUMENTS

| | | |
|---|---|---|
| EP | 2988948 | 11/2017 |
| JP | 2014109075 | 6/2014 |
| RU | 2304651 | 8/2007 |
| WO | 0066510 | 11/2000 |
| WO | 0181078 | 11/2001 |
| WO | 2009117649 | 9/2009 |
| WO | 2013015767 | 1/2013 |
| WO | 2015152862 | 10/2015 |

OTHER PUBLICATIONS

Calcium Carbonate / pulp paper mill, http://www.pulppapermill.com/calcium-carbonate/, retrieved Feb. 19, 2019.

* cited by examiner

100

200

RECORDING MEDIUM

BACKGROUND

Recording media such as sheet media and web media may be used to receive pigmented ink to form images thereon. The images may be in a form of designs, symbols, photographs, and/or text. The pigmented ink may be applied to the recording media by an ink applicator unit.

BRIEF DESCRIPTION OF THE DRAWING

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
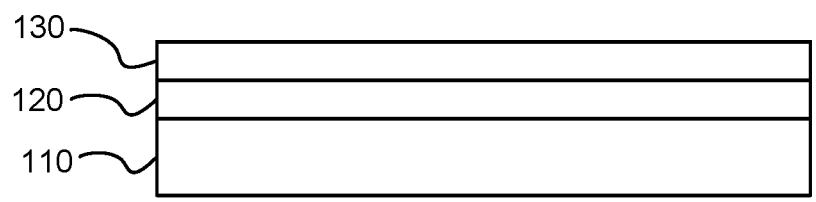
FIG. 1 is a cross-sectional view illustrating an example recording medium.

The recording medium 100 may include a substrate 110; a first coating 120 including an inorganic pigment, a first binder, and a fixative agent; and a second coating 130 including inorganic nanoparticles and a second binder, in which the inorganic pigment may be a plate-shaped pigment, as shown in FIG. 1. The disclosed recording medium 100 may be used in a high speed inkjet press, such as an HP™ inkjet web press, for example, printing at a speed of at least 400 feet/minute. The recording medium 1 may exhibit one or more properties, such as improved gloss, durability, and image quality as compared to recording medium that do not include the first and second coating 30.

The substrate 110 for use in the recording medium 100 may be a base paper. The substrate 110 may include cellulose fibers and/or synthetic fibers. The substrate 110 may also include a polymeric binder. The polymeric binder may be included, for example, when non-cellulose fibers are used. The cellulose fibers may be made from hardwood or softwood species. The synthetic fibers may be made from polymerization of organic monomers. In some examples, the substrate 110 may include non-cellulose fibers. The substrate 110 may be formed with a pilot paper machine with a pulp, or the like.

The base paper may be made by conventional methods for making acid, neutralized, or alkaline papers from paper stuff including cellulose pulp selected from chemical pulp such as LBKP (Leaf Bleached Kraft Pulp) and NBKP (Needle Bleached Kraft Pulp); mechanical pulp such as GP (Groundwood Pulp), PGW (Pressure GroundWood pulp), RMP (Refiner Mechanical Pulp), TMP (ThermoMechanical Pulp), CTMP (ChemiThermoMechanical Pulp), CMP (ChemiMechanical Pulp), and CGP (ChemiGroundwood Pulp); and waste paper pulp such as DIP (DeInked Pulp) (these may be used alone or in combination).

The substrate 110 may contain other additives, as appropriate, including a pigment dispersant, a thickener, a flow modifier, a defoamer, an antifoamer, a releasing agent, a foaming agent, a penetrant, a coloring dye, a coloring pigment, an optical brightener, an ultraviolet absorber, an antioxidant, a preservative, a fungicide, an insolubilizer, a wet paper strengthening agent, and a dry paper strengthening agent within a range that does not impair the desired effects of the first and second coatings on the recording medium 100.

The substrate 110 may have any degree of sizing that does not impair the desired effects of the disclosed recording medium 100. The degree of sizing of the substrate 110 may be adjusted by the amount of an internal sizing agent and/or the coating weight of a surface sizing agent that is applied on the base paper. An example of the internal sizing agent for acid base paper is a rosin sizing agent, and examples of the internal sizing agent for acid-free base paper include alkenyl succinic anhydride, alkyl-ketene dimer, an acid-free rosin sizing agent, and a cationic styrene-acryl sizing agent. Examples of the surface sizing agent include a styrene-acryl sizing agent, an olefin sizing agent, and a styrene-maleic sizing agent.

Although the thickness of the substrate 110 is not particularly limited, the substrate 110 may have a thickness of from about 50 µm to about 300 µm, and for example, from about 80 µm to about 250 µm.

In an example, the substrate 110 may be calendered before use.

The recording medium 100 may include a first coating 120. The first coating 120 may be applied on the substrate 110. The first coating 120 may include an inorganic pigment, a first binder, and a fixative agent.

The inorganic pigment may include fumed silica, colloidal silica, precipitated silica, silica gel, boehmite, alumina, titanium dioxide, grounded calcium carbonate, clay, kaolin, calcined clay, or a combination thereof. The inorganic pigment may be a plate-shaped inorganic pigment, such as clay, calcined clay, kaolin, or combinations thereof. In an example, the inorganic pigment may include from about 20% to about 50% by weight of plate-shaped inorganic pigment, for example, from about 30% to about 45%, and as a further example from about 35% to about 40% by weight. A commercially available plate-shaped pigment is a calcined clay KaMin™ 2000C (available from KaMin LLC, Macon, Ga.). The inorganic pigment of the first coating 120 may be a plate-shaped pigment. In another example, the inorganic pigment of the first coating 120 may include a plate-shaped pigment, an irregularly-shaped rhombohedral pigment, or both. In yet another example, the inorganic pigment of the first coating 120 may be an irregularly-shaped rhombohedral pigment, such as a ground calcium carbonate with a low aspect ratio.

The ground calcium carbonate may have a narrow particle size distribution and low aspect ratio (ratio between length and width) where 96% of the particles may be less than about 2 microns in diameter, and the aspect ratio may be less than about 5, for example less than about 4, and as a further example, less than about 3 In an example, at least about 80% by weight of the particles may be less than about 1 micron and may fall within the range of about 0.1-1 µm. In another example, the distribution may have at least about 85% of the particles less than about 1 micron and fall in the range of about 0.1-1 microns. In another example, about 98% of the particles may be less than about 2 microns in diameter. Yet another example may use a ground calcium carbonate with about 98% of the particles falling in the range of about 0.1-1.0 microns. The ground calcium carbonate having a narrow particle size distribution may be OMYA COVER-CARB® 85 ground calcite calcium carbonate (OMYA AG, Oftringen, Switzerland).

The inorganic pigment may be present in the first coating 120 in an amount of at least about 85 mass parts per 100 mass parts of the solid content of the total inorganic pigments in the first coating 120, for example, at least about 90 mass parts per 100 mass parts, and as a further example at least about 95 mass parts per 100 mass parts of the solid content of the total inorganic pigments in the first coating 120. In an example, the inorganic pigment may be a calcined clay in the first coating 120 in an amount of about 40 mass parts per 100 mass parts of the solid content of the total inorganic pigment. In another example, the inorganic pigment may be a ground calcium carbonate in the first coating 120 in an amount of about 60 mass parts per 100 mass parts of the solid content of the total inorganic pigment. In a further example, the inorganic pigment may be a combination of ground calcium carbonate and plate-shaped calcined clay in the first coating 120 in an amount of at least about 85 mass parts per 100 mass parts of the solid content of the total inorganic pigment, such as 100 mass parts per 100 mass parts of the solid content of the total inorganic pigment.

The first coating 120 may include a first binder. The first binder may include a water-dispersible binder, a water-soluble binder, or a combination thereof. The water-dispersible binder includes but is not limited to conjugated diene copolymer latexes, such as styrene-butadiene copolymer or acrylonitrile-butadiene copolymer; acrylic copolymer latexes, such as polymer of acrylic acid ester or methacrylic acid ester or methyl methacrylate-butadiene copolymer; vinyl copolymer latexes, such as ethylene-vinyl acetate copolymer and vinyl chloride-vinyl acetate copolymer; urethane resin latexes; alkyd resin latexes; unsaturated polyester resin latexes; and thermosetting synthetic resins, such as melamine resins and urea resins, and combinations thereof. The water-soluble binder may include, but is not limited to, starch derivatives such as oxidized starch, etherified starch, and phosphate starch; cellulose derivatives such as methylcellulose, carboxymethylcellulose, and hydroxyethyl cellulose; polyvinyl alcohol derivatives such as polyvinyl alcohol or silanol modified polyvinyl alcohol; natural polymeric resins such as casein, and gelatin or their modified products, soybean protein, pullulan, gum arabic, karaya gum, and albumin or their derivatives; vinyl polymers such as sodium polyacrylate, polyacrylamide, and polyvinylpyrrolidone; sodium alginate; polypropylene glycol; polyethylene glycol; maleic anhydride or copolymers thereof. In an example, the first binder of the first coating 120 includes a styrene-butadiene copolymer, such LITEX® PX 9740 (available from Synthomer) and a polyvinyl alcohol, such as MOWIOL® 4-98 (Kuraray America Inc.)

The first binder may be present in the first coating 120 in an amount of from about 1 to about 18 mass parts with respect to 100 mass parts of the total solid content of the inorganic pigment in the first coating 120. In an example, the first binder may be present in the first coating 120 in an amount of from about 3 to about 12 mass parts with respect to 100 mass parts of the total solid content of the inorganic pigment in the first coating 120. As a further example, the first binder may be present in the first coating 120 in an amount of from about 5 to about 11 mass parts with respect to 100 mass parts of the total solid content of the inorganic pigment in the first coating 120.

The first coating 120 may include a fixative agent. The fixative agent may be a salt of a polyvalent ion, such as a polyvalent anion salt or a polyvalent cation salt. The valency of the ion refers to the overall charge of the ionic species and is determined by the various oxidation states of the metal. Thus, for example, if the polyvalent ion is the cation of the salt, the charge is the overall charge of the cationic species. In an example, the polyvalent cation salt is a polyvalent metal cation.

Many types of polyvalent cations may be used as a salt as the fixative agent in the first coating 120. Examples of polyvalent cations include, but are not limited to, calcium, cadmium, copper, iron, magnesium, nickel, zinc, aluminum, or zirconium cations and, in particular, $Ca^{+2}$, $Cd^{+2}$, $Cu^{+2}$, $Fe^{+2}$, $Mg^{+2}$, $Ni^{+2}$, $Zn^{+2}$, $Al^{+3}$, $Fe^{+3}$, and $Zr^{+4}$.

The fixative agent may be a polyvalent cation salt of calcium, cadmium, copper, iron, magnesium, nickel, zinc, aluminum, or zirconium. Non-limiting examples of the salt used as the fixative agent in the first coating 120 include calcium chloride, calcium acetate, calcium nitrate, magnesium chloride, magnesium acetate, magnesium nitrate, magnesium sulfate, barium chloride, barium nitrate, zinc chloride, zinc nitrate, aluminum chloride, aluminum hydroxychloride, and aluminum nitrate. Similar salts will be appreciated by the skilled artisan. Particularly useful salts include $CaCl_2$, $MgCl_2$, $MgSO_4$, $Ca(NO_3)_2$, and $Mg(NO_3)_2$, including hydrated versions of these salts. Combinations of the salts may also be used.

The fixative agent may be present in the first coating 120 in an amount of about 1 to about 10 parts, more particularly about 3 to about 6 parts by weight based per 100 total parts of inorganic pigment. As the amount of the fixative agent present in the first coating 120 increases beyond 10 mass parts, then the gloss present on the recording medium 100 may decrease.

The first coating 120 may include additional components and/or additives, such as a pigment dispersant, a thickener, a flow modifier, a viscosity stabilizer, a pH adjuster, a surfactant, a defoamer, an antifoamer, a releasing agent, a foaming agent, a penetrant, a coloring dye, a coloring pigment, a white inorganic pigment, a white organic pigment, an optical brightener, an ultraviolet absorber, an antioxidant, a leveling agent, a preservative, a fungicide, an insolubilizer, a wet paper strengthening agent, and a dry paper strengthening agent as appropriate.

The first coating 120 may be applied at a coating weight ranging from about 7 to about 15 $g/m^2$, for example, from about 8 to about 12 $g/m^2$, and as a further example from about 9 to about 11 $g/m^2$.

The recording medium 100 may include a second coating 130. The second coating 130 may be applied on the first coating 120. The second coating 130 may include inorganic nanoparticles and a second binder.

The inorganic nanoparticles may include boehmite, hydrated alumina, fumed alumina, colloidal silica, precipitated silica, silica gel, fumed silica, or a combination thereof. Fumed silica may be composed of agglomerates of many non-porous particles of amorphous silica particles produced by high temperature hydrolysis of silicon tetrachloride. A silica gel may include porous amorphous silica particles with internal small pores, and may be manufactured from acid treatment of sodium silicate solution.

If silica is used as the inorganic nanoparticle, it may be selected from the following group of commercially available fumed silicas: Cab-O-Sil®LM-150, Cab-O-Sil®M-5, Cab- O-Sil®MS-55, Cab-O-Sil®MS-75D, Cab-O-Sil®H-5, Cab-O-Sil®HS-5, Cab-O-Sil®EH-5, Aerosil®150, Aerosil®200, Aerosil®300, Aerosil®350, and/or Aerosil®400. The inorganic nanoparticles may be alumina (e.g., modified or unmodified). In some examples, the inorganic nanoparticles may include pseudo-boehmite, which is aluminum oxide/hydroxide ($Al_2O_3 \times n\ H_2O$ where n is from 1 to 1.5). Commercially available inorganic nanoparticles may also be used, including, but not limited to, Sasol Disperal®/HP10, Disperal®HP14 boehmite, Cabot Cab-OSperse® PG003 and/or CabotSpectrAl®81 fumed alumina.

The second coating 130 may include a second binder. In an aspect, the second binder may be the same or different from the first binder in the first coating 120. The second binder may include a water-dispersible binder, a water-soluble binder, or a combination thereof. The water-dispersible binder includes but is not limited to conjugated diene copolymer latexes, such as styrene-butadiene copolymer or acrylonitrile-butadiene copolymer; acrylic copolymer latexes, such as polymer of acrylic acid ester or methacrylic acid ester or methyl methacrylate-butadiene copolymer; vinyl copolymer latexes, such as ethylene-vinyl acetate copolymer and vinyl chloride-vinyl acetate copolymer; urethane resin latexes; alkyd resin latexes; unsaturated polyester resin latexes; and thermosetting synthetic resins, such as melamine resins and urea resins, or a combination thereof. The water-soluble binder includes, but is not limited to, starch derivatives such as oxidized starch, etherified starch, and phosphate starch; cellulose derivatives such as methylcellulose, carboxymethylcellulose, and hydroxyethyl cellulose; polyvinyl alcohol derivatives such as polyvinyl alcohol or silanol modified polyvinyl alcohol; natural polymeric resins such as casein, and gelatin or their modified products, soybean protein, pullulan, gum arabic, karaya gum, and albumin or their derivatives; vinyl polymers such as sodium polyacrylate, polyacrylamide, and polyvinylpyrrolidone; sodium alginate; polypropylene glycol; polyethylene glycol; maleic anhydride or copolymers thereof. In an example, the second binder includes a polyvinyl alcohol, such as MOWIOL® 4088 (Kuraray America Inc.)

The second binder may be present in the second coating 130 in an amount of from about 1 to about 20 mass parts with respect to 100 mass parts of the total solid content of the inorganic nanoparticles in the second coating 130. In an example, the second binder may be present in the second coating 130 in an amount of from about 5 to about 18 mass parts with respect to 100 mass parts of the total solid content of the inorganic nanoparticles in the second coating 130. As a further example, the second binder may be present in the second coating 130 in an amount of from about 7 to about 16 mass parts with respect to 100 mass parts of the total solid content of the inorganic nanoparticle in the second coating 130.

The second coating 130 may include additional components and/or additives, such as a pigment dispersant, a thickener, a flow modifier, a viscosity stabilizer, a pH adjuster, a surfactant, a defoamer, a wetting agent, an antifoamer, a releasing agent, a foaming agent, a penetrant, a coloring dye, a coloring pigment, a white inorganic pigment, a white organic pigment, an optical brightener, an ultraviolet absorber, an antioxidant, a leveling agent, a preservative, a fungicide, an insolubilizer, a wet paper strengthening agent, and a dry paper strengthening agent as appropriate.

The second coating 130 may be applied at a coating weight ranging from about 1 to about 5 $g/m^2$, for example, from about 1 to about 3.5 $g/m^2$, and as a further example from about 2 to about 3 $g/m^2$.

Figure 2:
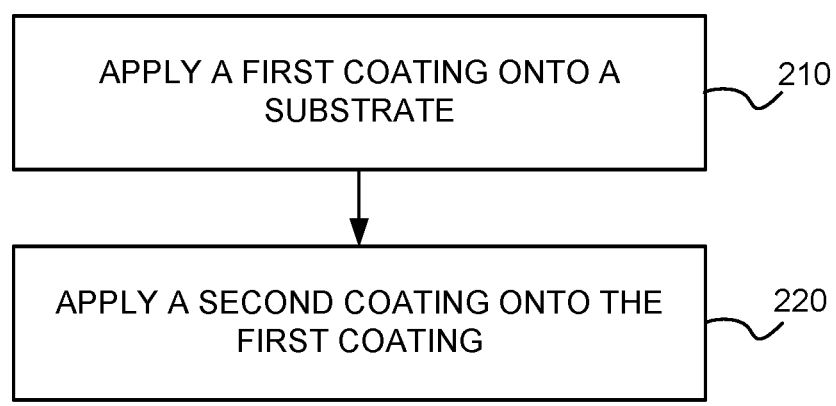
FIG. 2 is a flowchart illustrating an example method of making a recording medium.

As shown in FIG. 2, there is an example method 200 of making the recording medium 100 depicted FIG. 1. At block 210, the method 200 may include applying a first coating 120 onto a substrate 110, in which the first coating 120 may include an inorganic pigment, a first binder, and a fixative agent. At block 220, the method 200 may include applying a second coating 130 to the first coating 120, in which the second coating 130 may include inorganic nanoparticles and a second binder, and in which the inorganic pigment may be an irregularly-shaped rhombohedral pigment, such as a ground calcium carbonate. The method 200 may further include applying the first and second coatings 120, 130 to a single side of the substrate 110 or to both sides of the substrate 110. In an aspect, the first coating 120 may be applied directly to the substrate 110 without any intervening coatings. In another aspect, the second coating 130 may be applied directly to the first coating 120 without any intervening coatings. The method 200 may further include a drying step after application of the first coating 120 and before application of the second coating 130. The method 200 may further include a drying step after application of the second coating 130.

The method 200 of applying the first coating 120 and the second coating 130 is not particularly limited, and one method is to apply the first coating 120 on the substrate 110 and the second coating 130 on the first coating 120 using a coating device. Examples of the coating device include but are not limited to various blade coaters (such as rod blade coaters), air knife coaters, roll coaters, bar coaters, curtain coaters, and short dwell coaters. The coating device may be a blade coater, a curtain coater or a film transfer coater, which is suitable for high speed production, and, for example, a curtain coater. In an aspect, the first and second coatings 120, 130 may be applied using a Meyer rod.

The surface of the first coating 120 and the second coating 130 may be smoothened, as appropriate, by calendering treatment using, for example, a machine calender, a soft nip calender, a super calender, a multistage calender, and/or a multi-nip calender. However, the first coating 120 and the second coating 130 may not need to undergo calendering treatment.

The surface of the second coating 130 may have a 75-degree gloss value as measure using BYK Gardner Gloss Meter of 55% or more. The 75-degree gloss value may range from about 55% to about 90%, and particularly from about 60% to about 80%. The recoding medium that has a 75-degree gloss value within this range may have an improved gloss.

In an example, there may be a method of printing on a recording medium of FIG. 1. The method may include providing a recording medium including a substrate 110; a first coating 120 including an inorganic pigment, a first binder, and a fixative agent; and a second coating 130 including inorganic nanoparticles and a second binder, in which the inorganic pigment may be a plate-shaped inorganic pigment, as shown in FIG. 1. The method may include printing an image on the recording medium using an ink, such as a water-based pigment ink or a water-based pigment ink. The printed image may be allowed to dry in order to provide, for example, a printed image with enhance durability and high gloss.

The printing method for producing a printed recording medium or printed image on a recording medium may be an inkjet printing method. By inkjet printing method, it is meant herein a method in which a stream of droplets of ink is jetted onto the recording medium to form the desired printed image. The ink composition may be established on the recording medium via any suitable inkjet printing technique. Examples of inkjet method include methods such as a charge control method that uses electrostatic attraction to eject ink, a drop-on-demand method which uses vibration pressure of a Piezo element, an acoustic inkjet method in which an electric signal is transformed into an acoustic beam and a thermal inkjet method that uses pressure caused by bubbles formed by heating ink. Non-limitative examples of such inkjet printing techniques include thus thermal, acoustic and piezoelectric inkjet printing. In some examples, the ink composition may be applied onto the recording media using inkjet nozzles. In some other examples, the ink composition may be applied onto the recording method using thermal inkjet printheads.

In some examples, the printing method is a capable of printing more than about 50 feet per minute (fpm) (i.e. has a print speed that is more than about 50 fpm). The printing method described can be thus considered as a high-speed printing method. The web-speed could be from about 100 to about 4000 feet per minute (fpm). In some other examples, the printing method may be a printing method capable of printing from about 100 to about 1000 feet per minute. In yet some other examples, the printing method may be capable of printing at a web-speed of more than about 200 feet per minute (fpm).

In some example, the printing method may be a high-speed web press printing method. As "web press", it is meant herein that the printing technology encompasses an array of inkjet nozzles that span the width of the paper web. The array is thus able, for example, to print on 20", 30", and 42" or wider wide web on rolled papers. In some examples, the printing method as described herein prints on one-pass only. The paper passes under each nozzle and printhead only one time as opposed to scanning type printers where the printheads move over the same area of paper multiple times and only a fraction of total ink is used during each pass. The one-pass printing puts 100% of the ink from each nozzle/printhead down all at once and is therefore more demanding on the ability of the paper to handle all of the ink in a very short amount of time. In an example, the printing method may be a two-pass.

EXAMPLES

The Reference Example and Examples 1-4 were prepared using the formulations shown in Table 1.

TABLE 1

Formulations for a recording medium

| Design | Comparative | Example 1 | Example 2 | Example 3 | Example 4 |
|---|---|---|---|---|---|
| First Coating | | | | | |
| Calcined Clay | 40 | 40 | 40 | 40 | 40 |
| SBA Latex | 10 | 10 | 10 | 10 | 10 |
| PVOH | 1 | 1 | 1 | 1 | 1 |
| CaCl2 | 4 | 1 | 3 | 6 | 10 |
| GCC | 60 | 60 | 60 | 60 | 60 |
| First Coating coat weight | 13 gsm | 10 gsm | 10 gsm | 10 gsm | 10 gsm |
| Second Coating | | | | | |
| PVOH | no | 8 | 8 | 8 | 8 |
| wetting agent | no | 0.25 | 0.25 | 0.25 | 0.25 |
| defoamer | no | 0.6 | 0.6 | 0.6 | 0.6 |
| Boehmite alumina hydrate | no | 100 | 100 | 100 | 100 |
| Second Coating coat weight | no | 3 gsm | 3 gsm | 3 gsm | 3 gsm |
| Durability right after print | 2 | 4 | 4 | 4 | 3 |
| sheet gloss | 53 | 65 | 65 | 66 | 65 |
| Image Quality (Bleeding) | 2.5 | 3 | 5 | 5 | 5 |

In Table 1, the amounts of the components in the First Coating and the Second Coating are shown in mass parts. The coat weight (bottom and top) for the first coating and second coating is shown in grams per square meter (g/m$^2$).

In the First Coating, the calcined clay is a plate-shaped inorganic pigment, KaMin™ 2000C available from KaMin LLC, Macon, Ga. The SBA Latex is a first binder, for example, a styrene-butadiene copolymer, LITEX® PX 9740 available from Synthomer, Atlanta, Ga. The "PVOH" is an additional first binder, for example, a polyvinyl alcohol, MOWIOL® 4-98 (Kuraray America Inc.) The CaCl$_2$ is a fixative agent available from Cal-Chlor Corporation, Lafayette, La. The "GCC" is an irregularly-shaped rhombohedral inorganic pigment, for example, a ground calcium carbonate OMYA COVERCARB® 85, available from OMYA AG, Oftringen, Switzerland.

In the Second Coating, the PVOH is a second binder, such as a polyvinyl alcohol, MOWIOL® 4088 available from Kuraray America Inc. The wetting additive is a clear liquid nonionic organic surfactant, TEGO® Wet 510 available from Evonik Industries AG. The defoamer is a mixture of hydrophobic solids and polysiloxanes, BYK® 018 available from Byk. The boehmite alumina hydrate is an inorganic nanoparticle, DISPERSAL® HP14, available from Sasol North America, Inc.

A first coating (Example 1) was applied to a substrate 10 (75 gsm Hammer mill uncoated plain office paper from International Paper Company) at the coating weight specified in Table 1 using a Meyer Rod. The first coating was allowed to dry with hot air for 30 second. A second coating (Example 1) was applied to the dried first coating at the coating weight specified in Table 1 using a Meyer Rod. The second coating was allowed to dry with hot air for 30 second. The recording medium of Example 1 was then printed using an HP CM8060 MFP with webpress inkjet inks (A50) in the pens. The prints were made in 2 pass/6 dry spin mode. The printed recording medium was then tested for durability right after printing using the methods below. This method of making a recording medium and method of using a recording medium was repeated for the Comparative Example and Examples 2-4.

Durability—Finger Smudge: A finger was placed on the printed sample with a certain force to bend at the knuckle and drawn down. Eraser Durability: A pencil eraser was mounted on a force spring to provide a consistent and reproducible pressure. The pencil eraser was pressed against the printed sample and drawn down.

The prints were visually rated according to a 1-5 scale as follows: 5—No damage; 4—very slight damage; 3—some of the ink gone; 2—>50% of the ink removed; and 1—see white paper, ink total damage or transfer. The results of the two durability tests were averaged for each printed sample and are shown in Table 1.

Image Quality (Bleeding)—The image quality was checked on the black line on solid yellow to see how much ink spread from the black line into the yellow color. The printed samples were visually rated according to a 1-5 scale as follows: 5—No bleeding; 4—very slight bleeding; 3—some bleeding; 2—significant bleeding; and 1—ink flow. The results of the image quality test are shown in Table 1.

The gloss was measured using BYK Gardner Gloss Meter at 75 degrees. The results of the gloss test are shown in Table 1.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A recording medium, comprising:
   a substrate;
   a first coating comprising an inorganic pigment, a first binder, and a fixative agent; and
   a second coating comprising inorganic nanoparticles including boehmite alumina hydrate nanoparticles, the second coating further including a second binder;
   wherein the first binder in the first coating is present in an amount of from about 1 to about 11 mass parts with respect to 100 mass parts of a total solid content of the inorganic pigment in the first coating, and wherein the second binder in the second coating is present in an amount of from about 1 to about 8 mass parts with respect to 100 mass parts of a total solid content of the inorganic nanoparticles in the second coating.

2. The recording medium of claim 1, wherein the inorganic pigment comprises irregularly-shaped rhombohedral pigment including ground calcium carbonate with a low aspect ratio.

3. The recording medium of claim 1, wherein the first binder comprises a water-dispersible binder, a water-soluble binder, or a combination thereof.

4. The recording medium of claim 3, wherein the water-dispersible binder comprises a conjugated diene copolymer latex, acrylic copolymer latexes, vinyl copolymer latexes, urethane resin latexes, alkyd resin latexes, unsaturated polyester resin latexes, thermosetting synthetic resins, or a combination thereof.

5. The recording medium of claim 3, wherein the water-soluble binder comprises starch derivatives, cellulose derivatives, polyvinyl alcohol derivatives, natural polymeric resins, vinyl polymers, sodium alginate, polypropylene glycol, polyethylene glycol, maleic anhydride, and copolymers thereof.

6. The recording medium of claim 1, wherein the first binder comprises a styrene-butadiene copolymer and polyvinyl alcohol.

7. The recording medium of claim 1, wherein the fixative agent is a polyvalent cation salt.

8. The recoding medium of claim 1, wherein the fixative agent comprises a polyvalent cation salt of calcium, cadmium, copper, iron, magnesium, nickel, zinc, aluminum, or zirconium cations.

9. The recording medium of claim 1, wherein the inorganic pigment comprises plate-shaped pigment including clay, calcined clay; kaolin, or a combination thereof.

10. The recording medium of claim 1, wherein the inorganic pigment comprises a combination of a plate-shaped pigment and an irregularly-shaped rhombohedral pigment.

11. A method of making a recording medium, comprising:
    applying a first coating to a substrate, wherein the first coating comprises an inorganic pigment, a first binder, and a fixative agent; and
    applying a second coating to the first coating, wherein the second coating comprises inorganic nanoparticles including boehmite alumina hydrate nanoparticles, the second coating further including a second binder;
    wherein the first binder in the first coating is present in an amount of from about 1 to about 11 mass parts with respect to 100 mass parts of a total solid content of the inorganic pigment in the first coating, and wherein the second binder in the second coating is present in an amount of from about 1 to about 8 mass parts with respect to 100 mass parts of a total solid content of the inorganic nanoparticles in the second coating.

12. The method of claim 11, wherein the second coating is applied at a coating weight of from about 1 to about 5 g/m$^2$.

13. The recording medium of claim 1, wherein the second coating further comprises a wetting agent.

14. The recording medium of claim 1, wherein the inorganic pigment comprises the plate-shaped pigment in an amount of from about 20% to about 50% with the remainder of the inorganic pigment being the rhombohedral pigment.

15. The recording medium of claim 1, wherein the fixative agent is calcium chloride and wherein the calcium chloride is present in the first coating in an amount from about 3 to about 6 parts weight based on 100 total parts of inorganic pigment in the first coating.

16. The recording medium of claim 1, wherein the second coating is has a coating weight of from about 1 to about 5 g/m$^2$.

17. The method of claim 11, wherein the inorganic pigment is an irregularly-shaped rhombohedral pigment.

18. The method of claim 11, wherein the inorganic pigment comprises a combination of a plate-shaped pigment and an irregularly-shaped rhombohedral pigment.

19. The method of claim 11, wherein the first binder is selected from conjugated diene copolymer latex, acrylic copolymer latex, vinyl copolymer latex, urethane resin latex, alkyd resin latex, unsaturated polyester resin latex, thermosetting synthetic resin, starch derivative, cellulose derivative, polyvinyl alcohol derivative, natural polymeric resin, vinyl polymer, sodium alginate, polypropylene glycol, polyethylene glycol, maleic anhydride, copolymers thereof, or a combination thereof.

20. The method of claim 11, wherein the fixative agent is a polyvalent cation salt of calcium, cadmium, copper, iron, magnesium, nickel, zinc, aluminum, or zirconium cations; the inorganic pigment includes clay, calcined clay, kaolin, or a combination thereof; or a combination thereof.

* * * * *